United States Patent [19]

Elving et al.

[11] 4,281,365
[45] Jul. 28, 1981

[54] VARIABLE PHOTOELECTRIC CELL

[75] Inventors: Robert L. Elving, 1315 E. Romneya, Anaheim, Calif. 92805; Randolph S. Carlson, Irvine, Calif.

[73] Assignee: Robert L. Elving, Anaheim, Calif.

[21] Appl. No.: 78,886

[22] Filed: Sep. 25, 1979

[51] Int. Cl.³ ............................................. F21V 19/04
[52] U.S. Cl. .................................... 362/20; 362/145; 362/276; 362/254
[58] Field of Search .................. 362/20, 145, 254, 276

[56] References Cited
U.S. PATENT DOCUMENTS 4,152,752  5/1979  Niemi ..................................... 362/30

Primary Examiner—Stephen J. Lechert, Jr.
Attorney, Agent, or Firm—Knobbe, Martens, Olson, Hubbard & Bear

[57] ABSTRACT

An illumination control device for regulating the illumination in a controlled lighting area responds to natural illumination to control artificial lighting. The illumination control device turns the artificial light on and off at independently variable natural illumination levels to provide a hysteresis between the turn-on and turn-off points of the artificial lights. In addition, a variable time delay is included in the illumination control device to delay the turn-off of the lights for a variable period of time after the natural light level has risen above the level required for artificial light turn-off. Furthermore, the illumination control device includes a circuit for turning on all of the lights, regardless of the natural illumination level, when the circuit is initially energized so that the lights can be checked by maintenance personnel.

27 Claims, 4 Drawing Figures

VARIABLE PHOTOELECTRIC CELL

BACKGROUND OF THE INVENTION

This invention relates to a control device for regulating illumination in a controlled lighting area.

With the current interest in energy conservation, architects and designers are increasingly incorporating skylights and large window surfaces into buildings and other structures in order to take maximum advantage of natural light. However, because natural light can vary substantially, depending on weather conditions and attitude of the sun, it cannot be depended upon to provide sustained periods of adequate illumination, even during mid-day hours. Therefore, it has become necessary to supplement the natural light with artificial light during periods when the natural light falls below a predetermined level. This has been accomplished in the prior art by utilizing a control means comprising a light sensing device for measuring natural light coupled to a switch means to turn artificial lights on and off when the natural light reaches said predetermined level. However, weather conditions may be such that bright sunlight will shine intermittently through slits in the clouds, or passing clouds may continuously produce dark shadows alternating with bright sunlight. In such event, the fluctuations in the natural light will cause the artificial lights to switch on and off repeatedly, thereby causing concomitant changes in illumination which are distracting, as well as irritating to persons working in the controlled lighting area. Further, such excessive and unnecessary switching of the artificial lights may reduce the life of the fluorescent lights. This problem is inherent in prior art illumination control devices.

In addition to on and off oscillation caused by variations in natural light, illumination control devices may also oscillate if stray or reflected artificial light strikes the light sensing device. This usually occurs because the physical configuration of the artificial lights or objects within the controlled lighting area cause artificial light to be reflected so as to reach the light sensing device. Since the light sensing device cannot differentiate between natural and artificial light, it reacts as if the natural light alone has increased and consequently acts to turn off the artificial lights. With the source of the artificial light extinguished, the light sensing device will sense that the light is decreased and turn the lights back on again. This process will repeat itself indefinitely until such time as the intensity of the natural light becomes strong enough or weak enough to negate the effect of the stray artificial light.

The prior art has endeavored to solve this problem by circuit means which automatically create a differential between the amount of light needed to turn on the artificial lights and the amount of light needed to turn off the artificial lights. Thus, so long as this differential is greater than the amount of stray or reflected artificial light entering the light sensing device, the illumination control device will not oscillate. However, in the prior art, the turn on and turn off points must be raised or lowered in tandem, since the differential between such points is inherently fixed by the design of the circuit means. This is disadvantageous because controlled lighting areas have widely differing physical characteristics and configurations, and therefore, require correspondingly different differentials between turn on and turn off points in order to operate efficiently.

SUMMARY OF INVENTION

The present invention alleviates these and other difficulties of the prior art by providing a time delay circuit to prevent oscillations due to changes in natural light intensity, and an adjustable hysteresis circuit to prevent oscillations due to stray or reflected artificial light.

In the preferred embodiment, a lamp control means, responsive to trigger pulses, maintains artificial illumination so long as such trigger pulses are received. The trigger pulses, however, may be inhibited by an inhibit means, which causes the artificial lights to be turned off.

When the natural light increases to a predetermined level, a light sensing device causes a differential amplifier to send a low signal to a time delay circuit, which thereby causes the time delay circuit to become active. In its active state, the time delay circuit will send a signal to the inhibit means after elapse of a preselected period of time, thereby inhibiting the trigger pulses and turning off the artificial lights. Thus, the time delay circuit prevents the artificial lights from being turned off immediately in response to the light sensing device, but rather requires that a preselected time interval elapse first. If, during such preselected time interval, the level of natural light happens to fall below said predetermined level, the light sensing device will cause the amplifier to send a high signal to the time delay circuit, thereby resetting the time delay circuit and rendering it inactive. Thus, momentary changes in natural light during preselected time intervals due, for example, to changes in weather conditions, will not affect the artificial lighting. In this manner, the time delay circuit eliminates the problem of oscillations caused by variations in natural light.

The preferred embodiment addresses the problem of oscillations caused by stray or reflected artificial light by providing a hysteresis circuit which feeds the output of the differential amplifier back to the input reference voltage of said amplifier. This circuit is active only when the output of said amplifier is high and consequently only when the artificial lights are switched on. The effect of the hysteresis circuit is to automatically raise the predetermined level at which the artificial lights would otherwise be turned off, thereby compensating for any stray or reflected artificial light striking the light sensing device. By providing said hysteresis circuit with a potentiometer, the amount of feedback from the output to the input of said amplifier can be adjusted independently of the adjustment for regulating the turn on point of the artificial lights. Thus, the amount of compensation provided for stray or reflected artificial light may be adjusted to reflect the physical configuration or characteristics of any given controlled lighting area, thereby increasing the energy saving benefits of illumination control devices.

DESCRIPTION OF THE DRAWINGS

These and other advantages of the present invention are best understood through reference to the drawings, in which.

DETAILED DESCRIPTION OF THE PREFERRED EMBODIMENT

Figure 1:
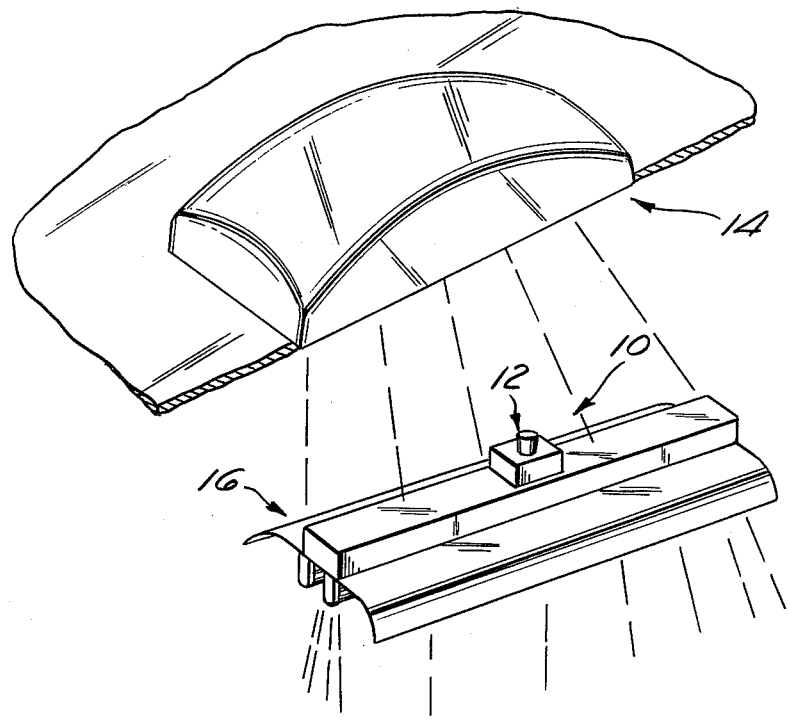
FIG. 1 is a perspective view of a controlled lighting area which illustrates the relationship between the present invention and the artificial and natural light sources.

Referring initially to FIG. 1, the present invention 10 is located in such a manner that a light sensing device 12 reads primarily natural light from a natural light source, such as skylight 14, rather than artificial light from an artificial source, such as light fixture 16. The present invention 10 is shown as being positioned on top of the light fixture 16 for illustrative purposes only, and, as will be obvious to one skilled in the art, its location can be varied dependent upon the specific application. Further, as will also be obvious to those skilled in the art, only the light sensing device 30 need be in position so as to read primarily natural light, and the remaining circuitry of the present invention may be located in any convenient manner.

Figure 2:
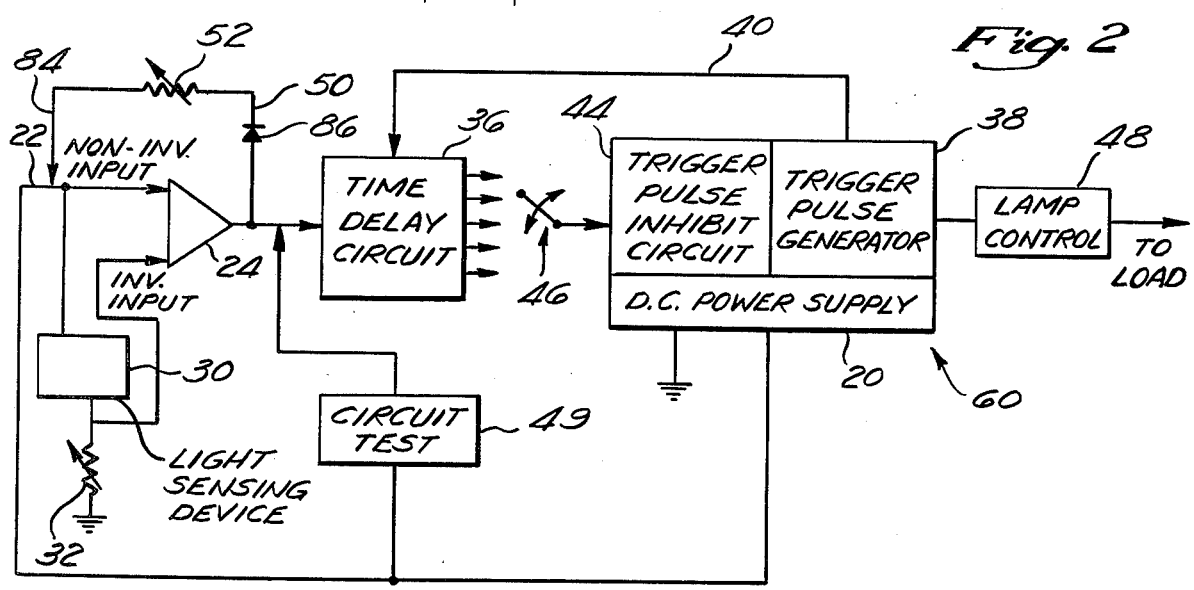
FIG. 2 is a schematic block diagram of the preferred embodiment of the present invention.

Referring now to FIG. 2, the operation of the present invention will be described. A DC power supply 20 creates a voltage on line 22, thereby establishing a reference voltage at a non-inverting input of a differential amplifier 24. The light sensing device 30 (typically comprising a photoresistor) and a potentiometer 32 are connected in series to the DC power supply 20 and provides a variable biasing voltage at an inverting input of the differential amplifier 24. In the preferred embodiment, the resistance of the light sensing device 30 is inversely proportional to the amount of light it receives. Thus, as light intensity decreases, the resistance of the light sensing device 30 will increase, thereby driving the inverting input of the differential amplifier 24 low. Conversely, increasing light intensity will decrease the resistance of the light sensing device 30 and drive the inverting input of amplifier 24 high. The polarity of the difference between the inverting and non-inverting (reference) inputs will determine whether the output of amplifier 24 is high or low. Thus, low light intensity will make the output of the amplifier 24 high, and high light intensity will make its output low. The amount of light necessary to change the output of amplifier 24 from high to low or low to high can be adjusted by means of potentiometer 32.

The output of differential amplifier 24 is connected to a time delay circuit 36, which typically comprises a counter or series of counters connected in cascade. The counters count trigger pulses which are generated by a trigger pulse generator 38 and input to time delay circuit 36 over a line 40. A high output from the differential amplifier 24 causes the counters to be continually reset, thereby making the time delay circuit 36 inactive. Conversely, a low output from the differential amplifier 24 will allow the counters to count, thereby activating the time delay circuit 36. A plurality of outputs 42(a) through (e) of the time delay circuit 36 are provided, wherein each output becomes successively high when the counters count a respective predetermined number of trigger pulses. Thus, the outputs 42 each correspond to a different time delay interval.

Any of the plurality of outputs 42 can be connected to an inhibit circuit 44 by a multi-throw switch 46. When the inhibit circuit 44 receives a signal from one of the outputs 42, it causes the trigger pulse generator 38 to cease sending trigger pulses. The effect upon time delay circuit 36 is that the trigger pulse counters merely stop counting and remain in a static condition. The trigger pulse generator 38, however, also supplies trigger pulses to a lamp control 48 at zero crossing points of the AC power. So long as trigger pulses are received, the lamp control 48 maintains AC power and hence, lamp illumination. But when trigger pulses cease, the lamp control 48 cuts off power to the lamps 16 (FIG. 1). Thus, the inhibit circuit 44 causes the artificial lights to turn off when it receives a signal from output 42.

The artificial lights 16 (FIG. 1) will continue in the off condition until the natural light striking light sensing device 30 decreases to the level necessary to cause the output of the amplifier 24 to become high. At such time, the output will cause the counters of time delay circuit 36 to be reset, thereby disabling the inhibit circuit 44, allowing the trigger pulse generator 38 to supply trigger pulses to the lamp control 48, and causing the artificial lights 16 to be turned on and to remain on.

Thus, in such a manner, the time delay circuit 36, while not affecting the manner in which the lights are turned on, prevents the artificial lights from being turned off until after a predetermined time interval corresponding to whichever output 42 is selected.

In addition, the schematic block diagram of FIG. 2 includes a hysteresis circuit comprising a line 50 and a potentiometer 52, wherein the output of the differential amplifier 24 is fed back to the non-inverting input of the amplifier 24. When the output of the amplifier 24 is high, the effect of this circuit is to raise the reference voltage at the non-inverting input of the amplifier 24, thereby increasing the difference in voltage between the two amplifier 24 inputs. A diode 86 effectively limits feedback to operate only when the output of the differential amplifier is high, thus generating the hysteresis condition described below. Since the magnitude of the difference in input voltages determines the point at which the artificial lights are turned on and off, and since the hysteresis circuit is effective in raising the reference voltage only when the aritificial lights 16 are on, the effect is to increase the amount of natural light needed to turn the lights 16 off. Thus, the hysteresis circuit automatically compensates for any stray or reflected artificial light striking the light sensing device 30, and thereby prevents the oscillation problem previously described. Further, the amount of feedback generated in the hysteresis circuit, and consequently the amount of compensation provided, can be controlled by means of potentiometer 52. Thus, the point at which the artificial lights 16 are turned off is a function of both potentiometers 32 and 52, while the point at which the artificial lights are turned on is a function of the potentiometer 32 only. In such a manner, the turn on and turn off points of the artificial lights may be set independently.

Figure 3:
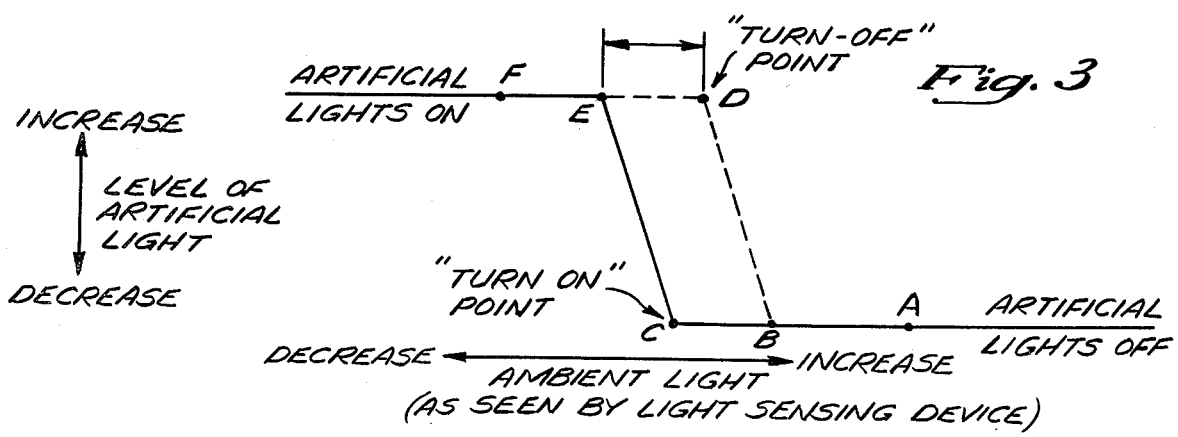
FIG. 3 is a graph illustrating the interrelationship and effect of the potentiometers shown in FIG. 2.

The effect of the hysteresis circuit can be more fully understood by referring to FIG. 3. Point C, the point at which the artificial lights 16 are turned on, is set by means of potentiometer 32. Thus, the process of turning the lights on is represented by path A, C, E, and F. If there were no hysteresis circuit, this same path would be followed in turning the lights off. However, the effect of the hysteresis circuit is to move the point at which the lights are turned off from point E to point D, thereby creating a hysteresis loop. Thus, while path A, C, E, F represents turning on the lights, path F, D, B, A represents turning off the lights. Since the width of the hysteresis loop is determined by potentiometer 52, it is, therefore, apparent that the turn on and turn off points may be set independently of each other.

Referring again to FIG. 2, a circuit test device 49 for testing the artificial lights 16, typically comprising a capacitor located between the DC power supply 20 and the output of the amplifier 24, is also provided. When power is first supplied to the circuit, the device 49 initially acts as a short, thereby driving the output of the amplifier 24 high and resetting the time delay circuit 36. Since the time delay circuit 36 prevents the inhibit means 44 from inhibiting trigger pulses until after the elapse of a preselected time interval, the artificial lights will turn on, at least for a period equal to such preselected time interval, regardless of the light on the sensor 30. This allows maintenance persons, as well as others, to check for burned out bulbs simply by switching the power off and on again.

Figure 4:
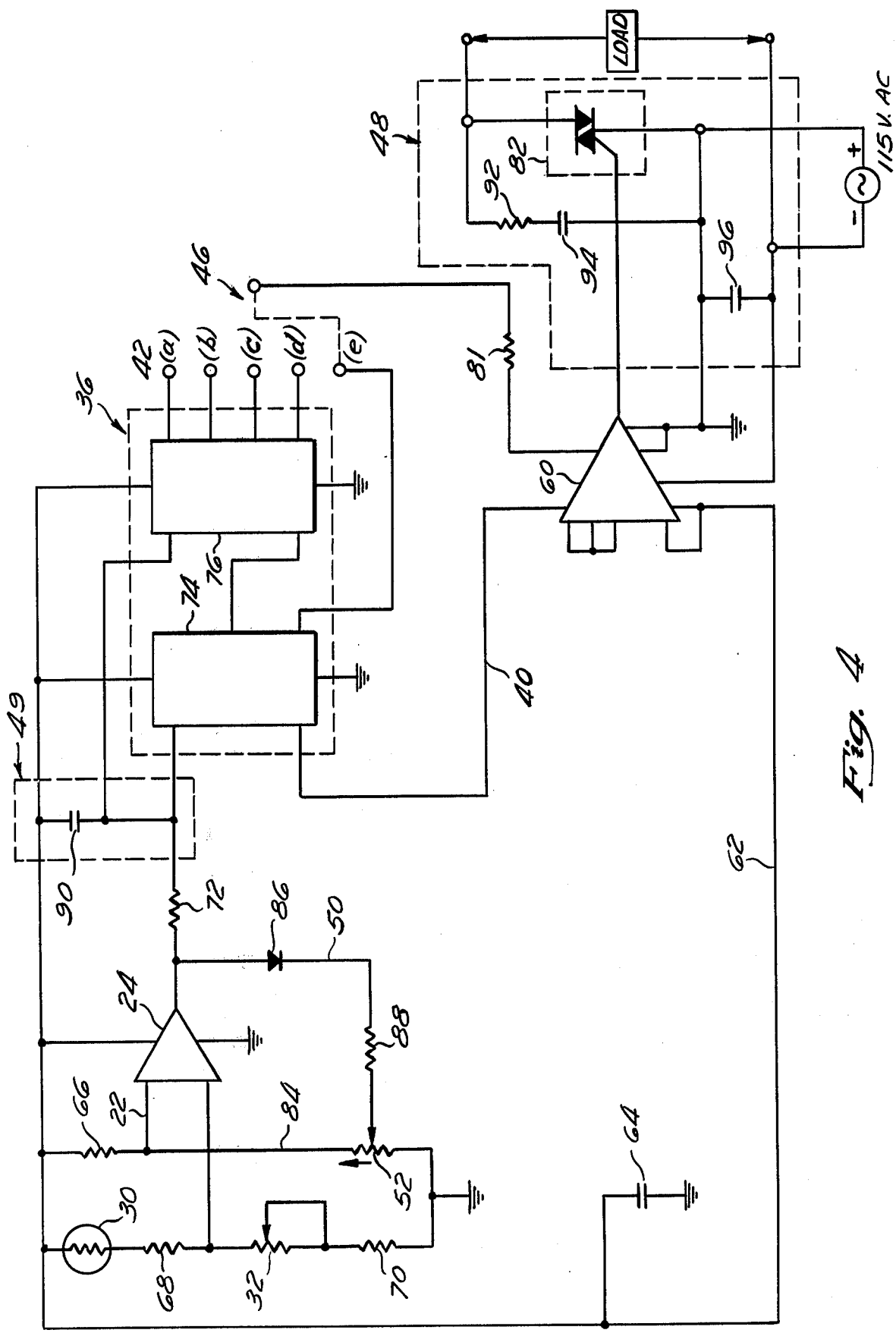
FIG. 4 is a schematic circuit diagram of the preferred embodiment of the present invention.

Referring now to FIG. 4, the schematic circuit diagram will be described. A zero voltage switch 60, such as RCA, CA 3058, which is well known in the art, comprises the trigger pulse inhibit circuit 44, the trigger pulse generator 38, and the DC power supply 20, previously referred to in FIG. 2. DC power is supplied by the zero voltage switch 60 over a line 60 and is filtered by a capacitor 64. A reference voltage is established at the non-inverting input of the amplifier 24 by biasing such input with a resistor 66 and the potentiometer 52. The potentiometer 52 is connected so that, for the purposes of biasing such input, its resistance is fixed. The inverting input of the amplifier 24 is variably biased by the photoresistor 30, a resistor 68, the potentiometer 32, and a resistor 70. Since the resistance of the photoresistor 30 is inversely proportional to the amount of light striking such photoresistor, the current through the potentiometer 32 and the resistor 70, and consequently the bias voltage at the inverting input of the amplifier 24 will be proportional to the amount of such light. Thus, decreasing light intensity will drive the bias voltage at the inverting input of the amplifier 24 low, and increasing light intensity will drive the bias voltage at the inverting input toward the reference voltage of the non-inverting input. If the difference between these two input voltages is sufficiently large, the output of the amplifier 24 will be driven high. Conversely, if the difference is not sufficiently large, the output of the amplifier 24 will be low. Thus, whether the output of the amplifier 24 is high or low is dependent on the amount of light striking photoresistor 30. The amount of light necessary to cause the amplifier 24 output to change states can be adjusted by varying potentiometer 32.

The output of the amplifier 24 is connected through a current limiting resistor 72 to the reset inputs of counters 74 and 76 of the time delay circuit 36. In the preferred embodiment, both of the counters 74 and 76 are twelve stage binary ripple counters, well known in the art, such as RCA CD 4040B, which count trigger pulses generated by the trigger pulse generator 38 (FIG. 2) of the zero voltage switch 60 and sent over a line 78 to the counter 74. The counter 76 is connected in cascase with the counter 74 by a line 80 on which the counter 74, after counting a predetermined number of trigger pulses, will send trigger pulses to the counter 76. A plurality of outputs 42(a) through (e) from the counters 74 and 76 are provided, wherein each output becomes successively high when the counters count a respective predetermined number of trigger pulses. In such a manner, each of the outputs 42 corresponds to a different delay period. Each of the outputs 42 can be selectively connected through a current limiting resistor 81 to the trigger pulse inhibit circuit 44 (FIG. 2) of the zero voltage switch 60 by a multi-throw switch 46.

In addition to supplying trigger pulses for the counters 74 and 76, the trigger pulse generator 38 (FIG. 2) of the zero voltage switch 60 also supplies trigger pulses at zero crossings of the AC source sine wave to a triac 82. Thus, so long as trigger pulses are supplied, the triac 82 causes the artificial lights 16 (FIG. 1) to turn on and remain on. However, if the trigger pulse inhibit circuit 44 (FIG. 2) receives a high signal from the selected output 42, the trigger pulse generator 38 (FIG. 2) will stop sending trigger pulses to the triac 82, thereby causing the artificial lights 16 (FIG. 1) to turn off and remain off. Thus, the inhibit circuit 44 (FIG. 2) of the zero voltage detector 60 causes the artificial lights to turn off when a high signal is received from the output 42, and to turn on when a low signal is received. A low signal will be received when the light striking the photoresistor 30 decreases to a point sufficient to cause the output of the amplifier 24 to be high. Such high output will cause the counters 74 and 76 to be continually reset, thereby keeping the outputs 42 low, allowing the trigger pulse generator 38 (FIG. 2) to send trigger pulses to the triac 82, and causing the artificial lights 16 (FIG. 1) to immediately turn on. However, when the light striking the photoresistor 30 increases to a level sufficient to cause the output of the amplifier 24 to become low, the counters 74 and 76 will begin to count trigger pulses, thereby causing each of the outputs 42 to become successively high. The output 42, selected by positioning the multi-throw switch 46, will send a signal to the inhibit circuit 44 (FIG. 2), thereby inhibiting the trigger pulse generator 38 (FIG. 2) from sending trigger pulses to the triac 82 and causing the artificial lights 16 (FIG. 1) to turn off and remain off. Thus, the counters 74 and 76 of the time delay circuit 36, while not affecting the manner in which the artificial lights 16 are turned on, prevents the artificial lights 16 from being turned off until after a predetermined time interval corresponding to whichever output 42 is selected.

A hysteresis circuit is also included to provide compensation for stray or reflected artificial light striking photoresistor 30, whereby the output of the amplifier 24 is fed back over the line 50, a line 84, and the line 22 to the non-inverting (reference) input of the amplifier 24. The line 50 is provided with a diode 86 to prevent reverse current flow and a resistor 88 to limit current. The line 84 is provided with the potentiometer 52 by which the amount of feedback can be adjusted. When the output of the amplifier 24 is low, the effect of the hysteresis circuit is inconsequential, due to the diode 86. However, when the amplifier 24 output is high, the effect of the hysteresis circuit is to raise the reference voltage at the non-inverting input of the amplifier 24. Thus, the diode 86 effectively limits feedback through the potentiometer 52 to one direction only. Since the output of the amplifier 24 will be high only when the artificial lights 16 (FIG. 1) are on, the hysteresis circuit will raise the reference voltage only when such lights are on. Thus, the increased reference voltage will proportionally increase the amount of light necessary to cause photoresistor 30 to drive the output of the amplifier 24 low, thereby turning off artificial lights 16. In such a manner, this hysteresis circuit provides compensation for any stray or reflected artificial light striking the photoresistor 30. The amount of such compensation can be adjusted by varying the potentiometer 52. Thus, the turn on and turn off points of artificial lights 16 may be set independently of each other. The operation of this hysteresis circuit can be more fully understood by referring to the above discussion of FIG. 3.

The circuit test device 49 comprises a capacitor 90 which is connected at one end to the power supply 20 at the zero voltage switch 60 and at the other end between the current limiting resistor 72 and the reset inputs of the counters 74 and 76. When the DC power supply 20 is initially turned on, the capacitor 90 creates a momentary short circuit which causes the counters 74 and 76 to be reset, even though the amount of light striking the photoresistor 30 is sufficient to drive the output of the amplifier 24 low. This causes output 42 to go low, thereby allowing the trigger pulse generator 38 (FIG. 2) of the zero voltage switch 60 to send trigger pulses to the triac 82 and turn on the artificial lights 16 (FIG. 1). The artificial lights 16 will remain on for at least a period equal to the time delay interval corresponding to whichever output 42 is selected. This allows maintenance persons, as well as others, to check for burned out bulbs simply by switching the power off and on again.

A snubber circuit comprising a resistor 92 and a capacitor 94, connected in series across the triac 82 and the DC power supply 20 (FIG. 2) is provided to protect these components from transient voltages. In addition, a capacitor 96 is connected across the DC power supply 20 at zero voltage switch 60 in order to retard the phase of the AC source by an amount sufficient to compensate for the inductive load, if any, of artificial lights 16.

We claim:

1. An illumination control device for regulating illumination in a controlled lighting area, including both natural and artificial lighting, comprising:
    means for turning on an artificial light when the amount of natural light entering said controlled lighting area reaches a first predetermined level;
    means for turning off said artificial light when said natural light reaches a second predetermined level;
    first means for adjusting said first predetermined level; and
    second means for adjusting said second predetermined level independently of said first predetermined level.

2. An illumination control device, as defined in claim 1, wherein said second means comprises a hysteresis circuit for adjusting said second predetermined level at a predetermined difference from said first predetermined level.

3. An illumination control device, as defined in claim 1, wherein said second predetermined natural light level is above said first predetermined natural light level.

4. An illumination control device, as defined in claim 1, additionally comprising:
    means for sensing natural light entering said controlled lighting area, said sensing means being connected to control said means for turning on said artificial light and said means for turning off said artificial light.

5. An illumination control device, as defined in claim 1, additionally comprising:
    time delay means connected to said means for turning off said artificial light, said time delay means delaying the turning off of said artificial light after said natural light reaches said second predetermined level.

6. An illumination control device, as defined in claim 5, wherein said time delay means introduces a variable delay.

7. An illumination control device, as defined in claim 1, additionally comprising:
    test means for turning on said artificial light when said immuniation control device is initially energized, regardless of the level of natural light entering said control lighting area.

8. An illumination control device, as defined in claim 1, wherein said means for turning on an artificial light comprises a differential amplifier comparing the level of said natural light entering said controlled lighting area and a reference level, and wherein said means for turning off said artificial light comprises a feedback loop connected to said differential amplifier, said feedback loop including a diode.

9. An illumination control device for regulating illumination in a controlled lighting area, including both natural and artificial lighting, comprising:
    control means for turning an artificial light on and off in response to the amount of natural light entering said controlled lighting area; and
    hysteresis means connected to said control means for creating a differential between the amount of said natural light necessary to turn on said artificial light and the amount of said natural light necessary to turn off said artificial light, said differential being adjustable.

10. An illumination control device, as defined in claim 9, additionally comprising:
    means for manually adjusting said hysteresis means for independently manually adjusting the amount of said natural light necessary to turn said artificial light on and off.

11. An illumination control device, as defined in claim 9, additionally comprising:
    a sensor responsive to the amount of natural light entering said control lighting area, said sensor connected to control said control means and said hysteresis means.

12. An illumination control device, as defined in claim 9, wherein said amount of light necessary to turn on said artificial light is below said amount of natural light necessary to turn off said artificial light.

13. An illumination control device, as defined in claim 9, additionally comprising:
    time delay means responsive to said hysteresis means and said control means for delaying the turn-off of said artificial light after said natural light has reached a level necessary to turn said natural light off.

14. An illumination control device for regulating the illumination in a controlled lighting area, including both natural and artificial lighting, comprising:
    (a) measuring means for determining the amount of natural light entering said controlled lighting area;
    (b) adjusting means, connected to said measuring means, for adjustably setting a first predetermined level at which an artificial light shall be turned on;
    (c) hysteresis means, connected to said measuring means and cooperating with said adjusting means, for adjustably setting a second predetermined level at which said artificial light shall be turned off, whereby said second predetermined level is independent of said first predetermined level; and
    (d) switch means, responsive to said measuring means and said adjusting means for turning said artificial light on at said first predetermined level, and additionally responsive to said hysteresis means for turning said artificial light off at said second predetermined level.

15. An illumination control device according to claim 14 wherein said hysteresis means comprises a differential amplifier, the output of said differential amplifier connected to an input of said differential amplifier through a variable resistor and a diode.

16. An illumination control device for regulating illumination in a controlled lighting area, comprising:
   means responsive to the amount of natural light entering said controlled lighting area for turning an artificial light on and off when said natural light has, respectively, fallen below or risen above a predetermined level; and
   time delay means for preventing said means from turning off said artificial lights until after said natural light has remained above said predetermined level for a predetermined period of time.

17. An illumination control device, as defined in claim 16, wherein said time delay means additionally comprises:
   means for adjusting said predetermined period of time.

18. An illumination control device, as defined in claim 16, wherein said time delay means comprises a counter responsive to said means for turning an artificial light on and off.

19. An illumination control device, as defined in claim 18, wherein said counter produces a time delay output when said counter has reached a variable count level.

20. An illumination control device, as defined in claim 19, wherein said counter is connected to count the power frequency applied to said artificial light.

21. An illumination control device, as defined in claim 16, additionally comprising:
   means for turning on said artificial light regardless of the level of said natural light entering said controlled lighting area for a second predetermined period of time after said illumination control device is initially energized.

22. An illumination control device, as defined in claim 16, wherein said means for turning an artificial light on and off turns said artificial light on immediately when said natural light falls below said predetermined level.

23. An illumination control device for regulating illumination in a controlled lighting area, comprising:
   first means for turning on an artificial light when the amount of natural light entering said controlled lighting area reaches a first predetermined level;
   second means for turning off said artificial light when said natural light reaches a second predetermined level; and
   time delay means for preventing said second means from turning off said artificial light until after said natural light has remained at or above said second predetermined level for a predetermined period of time.

24. An illumination control device, as defined in claim 23, wherein said time delay means additionally comprises:
   means for adjusting said predetermined period of time.

25. An illumination control device for regulating the illumination in a controlled lighting area comprising:
   (a) measuring means for determining the amount of natural light entering said controlled lighting area;
   (b) time delay means responsive to said measuring means; and
   (c) switch means, responsive to said measuring means for turning an artificial light on, and additionally responsive to said time delay means for turning said artificial light off, wherein said time delay means inhibits the operation of said switch means for a predetermined period of time.

26. An illumination control device according to claim 25, wherein said time delay means comprises a binary counter.

27. An illumination control device for regulating the illumination in a controlled lighting area comprising:
   circuit means responsive to the amount of natural light entering said controlled lighting area for turning an artificial light on and off; and
   test means automatically energizing said artificial light for a period of time, regardless of the amount of natural light entering said controlled lighting area, said period of time beginning immediately upon said circuit means initially receiving power, and being of sufficient duration to enable said artificial light to be checked for burned-out bulbs.

* * * * *